(12) United States Patent
Chen et al.

(10) Patent No.: US 9,798,435 B2
(45) Date of Patent: Oct. 24, 2017

(54) TOUCH-SENSITIVE PANEL APPARATUS, CONTROL CIRCUIT AND METHOD FOR SCANNING TOUCH EVENT

(71) Applicant: Wacom Co., Ltd., Saitama (JP)

(72) Inventors: Chang-Hsien Chen, Hsinchu County (TW); Chih-Hung Huang, Hsinchu County (TW)

(73) Assignee: Wacom Co., Ltd., Saitama (JP)

( * ) Notice: Subject to any disclaimer, the term of this patent is extended or adjusted under 35 U.S.C. 154(b) by 432 days.

(21) Appl. No.: 14/058,224

(22) Filed: Oct. 19, 2013

(65) Prior Publication Data

US 2015/0022485 A1 Jan. 22, 2015

(30) Foreign Application Priority Data

Jul. 19, 2013 (TW) .............................. 102125922 A (51) Int. Cl.
*G06F 3/046* (2006.01)
*G06F 3/041* (2006.01)
*G06F 3/044* (2006.01)

(52) U.S. Cl.
CPC .............. *G06F 3/046* (2013.01); *G06F 3/044* (2013.01); *G06F 3/0416* (2013.01)

(58) Field of Classification Search
CPC ........... G06F 3/045; G06F 3/044; G06F 3/046
See application file for complete search history.

(56) References Cited

U.S. PATENT DOCUMENTS 8,279,196 B2 10/2012 Tsai
8,884,917 B2 11/2014 Seo

2004/0027323 A1* 2/2004 Tanaka et al. .................. 345/98
2009/0251434 A1* 10/2009 Rimon et al. ................. 345/173
2010/0026660 A1* 2/2010 Kitamura ...................... 345/174

(Continued)

FOREIGN PATENT DOCUMENTS

CN 101561730 A 10/2009
TW 200719234 A 5/2007

(Continued)

OTHER PUBLICATIONS

Taiwanese Office Action dated Aug. 13, 2015, for corresponding TW Application No. 102125922, 10 pages.

(Continued)

*Primary Examiner* — Nelson Rosario
*Assistant Examiner* — Scott Au
(74) *Attorney, Agent, or Firm* — Seed IP Law Group LLP (57) ABSTRACT

Disclosure is related to a touch-sensitive panel apparatus, a control circuit, and a method for scanning touch event. The method is generally adapted to sensing a touch event when a touch object is used to contact a touch-sensitive panel device. The method in the beginning includes performing a time-division scanning process for separately scanning a first sensing region and a second sensing region according to a scanning timing scenario. After that, a triggering zone may be sensed when the scanning process finds a touch event. A full-time scanning process is then performed to the triggering zone. A touching position may be determined according to the scanning process. In one further embodiment, the method then verifies an operating frequency for the touch event so as to confirm a triggering event.

15 Claims, 8 Drawing Sheets

(56) References Cited

U.S. PATENT DOCUMENTS

| | | |
|---|---|---|
| 2010/0214254 A1 | 8/2010 | Tsai |
| 2011/0025644 A1* | 2/2011 | Lin et al. ...................... 345/174 |
| 2011/0157068 A1 | 6/2011 | Parker et al. |
| 2012/0071149 A1 | 3/2012 | Bandyopadhyay et al. |
| 2012/0075205 A1 | 3/2012 | Huang et al. |
| 2012/0169660 A1 | 7/2012 | Seo |
| 2013/0176271 A1 | 7/2013 | Sobel et al. |
| 2013/0314361 A1* | 11/2013 | Saitoh .................. G06F 3/0412 345/173 |
| 2014/0049488 A1* | 2/2014 | Chen et al. ................... 345/173 |
| 2014/0160065 A1* | 6/2014 | Zhang .................. G06F 3/0418 345/174 |
| 2014/0232665 A1* | 8/2014 | Lee et al. ...................... 345/173 |

FOREIGN PATENT DOCUMENTS

| | | |
|---|---|---|
| TW | 201032115 A | 9/2010 |
| TW | 201214217 A | 4/2012 |
| TW | 201227482 A | 7/2012 |
| TW | 201312410 A | 3/2013 |

OTHER PUBLICATIONS

Chinese Office Action dated Oct. 9, 2016, for corresponding CN Application No. 201310329888.9, 10 pages.

\* cited by examiner

TOUCH-SENSITIVE PANEL APPARATUS, CONTROL CIRCUIT AND METHOD FOR SCANNING TOUCH EVENT

BACKGROUND OF THE INVENTION

1. Field of the Invention

The present invention is related to a touch-sensitive apparatus, a control circuit, and a method for scanning a touch event thereon, for the purpose of power saving with great performance, in particular to the apparatus and circuit performing a time-division scanning with different frequencies.

2. Description of Related Art

Many conventional technologies are provided to perform detection of touching position on the touch-sensitive panel. Besides the capacitance-type or resistance-type touch panel generally adapted to the handheld electronic device, a technology using the sensing circuit beneath the panel to detect any sensing signal while a specific electromagnetic conductor approaches the panel. This electromagnetic panel is usually applied to the conventional input device such as digital tablet, digitizer, or electronic white board.

Regarding the conventional technology incorporating a specific electromagnetic object or finger to trigger an electromagnetic event in a touching position, a control and driving circuit is usually provided to control power supplied to the sensing circuit beneath the touch-sensitive panel to perform scanning.

The sensing circuits for the whole panel are used to sense the signals over two directions, such as X and Y axial directions. The sensing circuits of both directions are connected with the driving circuit and control circuit of the panel device. The driving circuit continuously supplies power to the sensing circuits. Every touching point upon the touch-sensitive panel is able to sense signals over the two directions. The control circuit then determines the touching position.

Thus, since the every circuit loop of the sensing circuits of the touch-sensitive panel continuously scans the touching position, it needs long charging time for charging the circuits, and also consumes powers.

SUMMARY OF THE INVENTION

For providing a touch-sensitive panel with great performance and advantage of power saving, provided in accordance with the present invention is related to a touch-sensitive apparatus, a control circuit, and a method for scanning any touch event. In the method, a time-division scanning scheme and a configuration of scanning zones are introduced. The method firstly acquires a triggering position by scanning a partial zone.

A further partial scanning is employed to obtain a touching position. The scanning process in the method needs no whole-panel charging and scanning, therefore it achieves power saving. Further, the scanning process may be adjusted based on a ratio of scanning time. The relatively important region should be mostly scanned. The scheme allows the apparatus adopting the method to be operated with a power-saving mode with great performance.

In an exemplary embodiment, the method for scanning the touch event is adapted to sensing a touching position of the touch-sensitive apparatus. For example, a touch object is utilized to touch the touch-sensitive apparatus. In the beginning of the method, a scanning timing is configured to define a ratio of the sensing lines in different regions within a period of scanning time. That is, a scanning timing scenario is configured to allocate a ratio of scanning the first sensing region and the second sensing region within the scan period. After that, in accordance with a scanning timing scenario, the method is to scan the first sensing region and the second sensing region by a time-division scheme. A triggering zone may be obtained according to a scanning result. When acquiring a limited zone, a full-time scanning may be performed over the triggering zone. A position with respect to a touch event according to the scanning result is then determined.

In one specific embodiment, the touch-sensitive apparatus embodies a digital tablet, a digitizer, or an electronic whiteboard. Thus the mentioned first sensing region may work as function instruction zone of the touch-sensitive apparatus and the second sensing region may be a work zone or a zone including both the function instruction zone and the work zone. Further, the first sensing region, the second sensing region, or the triggering zone may be formed within a zone surrounded by all or part of the sensing lines over a first axial direction and a second axial direction. The time-division scanning or the full-time scanning may be performed by sequentially charging all or part of the sensing lines over the first axial direction and the second axial direction.

In one further embodiment, the method for scanning the touch event is used to determine an event of the touch object touching the touch-sensitive apparatus. The method includes performing a time-division scanning over the first sensing region and the second sensing region according to scan timing. The scanning process is used to acquire a triggering zone. After that, over this triggering zone, a full-time scanning is performed. A touching position onto the touch-sensitive apparatus made by the touch object may then be obtained.

The method then confirms an operating frequency for the touching position is obtained. The operating frequency corresponds to the triggering event. In which, the operating frequency includes a first frequency and a second frequency, that means the touch-sensitive apparatus may simultaneously operate with the first frequency and the second frequency. The triggering event is such as a moving position or any triggering instruction made by the touch object. For example, the triggering event indicates the moving position of the touch object when the triggering event is confirmed as in the first frequency; the triggering event indicates the triggering instruction made by the touch object while the triggering event is confirmed with the second frequency.

The step of confirming the triggering event according to the operating frequency in the method includes scanning the touch signals with the first frequency with a gain. Next, using the same gain, the touch signals with the second frequency are scanned. The touch signals respectively with the first frequency and the second frequency are compared to confirm if the triggering event occurs with the first frequency or the second frequency.

The touch-sensitive apparatus includes a touch-sensitive panel. Upon the panel, the sensing lines over the first axial direction and the sensing lines over the second axial direction are included. A control circuit is included for controlling the charging timing for powering the sensing lines over the first axial direction and over the second axial direction. A time-division scanning and a full-time scanning method are then performed. Further, a switch-selection circuit is used to turn on or turn off part or all the sensing lines over the first and the second axial directions according to a control signal made by the control circuit.

The control circuit includes a driving circuit used to drive the sensing lines of the touch-sensitive panel to be turned on or off; a power management unit used for managing power supplied to the sensing lines upon the touch-sensitive panel; and a signal process unit that is used to determine the triggering zone or position of touch event according to a sensing signal.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The general handwriting touch-sensitive panel is such as digital tablet, digitizer, or electronic whiteboard. The technology for conducting input method is featured to have electromagnetic-induced or film-resistant sensing elements applied to a digital panel. The electromagnetic-induced sensing element is cooperated with a touch object which employs electromagnetic-induced technology interacted with the panel. The touch object is such as a stylus which is provided for a user to hold for handwriting easily.

The stylus provided in the disclosure is such as a handwriting device with electromagnetic circuit. The tip of stylus is the portion for touching the touch-sensitive panel. However, the types of tips may not be limited. The body of stylus is equipped with one or more buttons for launching special functions. An oscillation circuit may be installed in the body of stylus, and is used to define the frequency of electromagnetic wave.

A touch event occurs when the stylus touches the touch-sensitive panel. Since the electromagnetic-induced sensing lines sense the touch event, a triggering signal is generated. The mentioned control circuit is used to detect and compute the sensing signals that are electromagnetically induced. A signal processing unit determines a position with respect to the touch event according to the scanning result, and further determines the manipulating signals made by the stylus.

For providing a touch-sensitive panel with advantage of power saving and great performance, provided in accordance with the present invention is related to a touch-sensitive apparatus, a control circuit, and a method of scanning touch event. In the process of scanning, a time-division and full-time scanning schemes may be performed. The method may effectively acquire a triggering zone with respect to the touch event. Next, a further partial scanning may be performed to obtain a touching position. It achieves power saving since the process may not go through the whole panel, including charging and scanning procedures.

Figure 1:
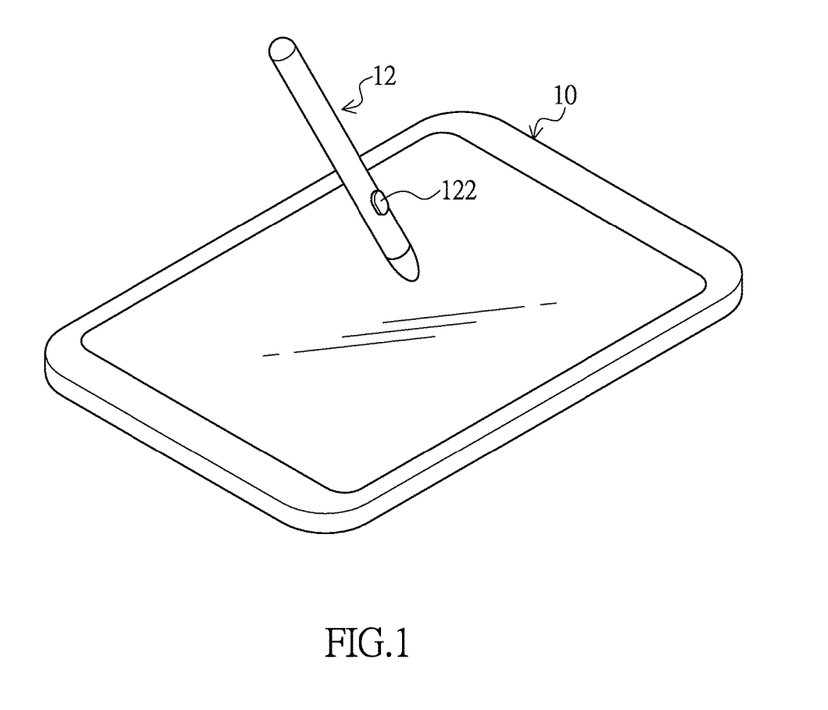
FIG. 1 schematically shows a stylus used to conduct input over a touch panel in one of circumstances.

Reference is made to FIG. 1 schematically shows a circumstance that a stylus is used to input on a touch panel. A touch-sensitive panel 10 is shown. A stylus 12 is held by a hand. The stylus 12 may be equipped with a function key 122. When the user holds the stylus 12 to move above the touch-sensitive panel 10 but not contact with the panel 10, a first stage of the sensing procedure starts to be operated. A zone around the stylus 12 may be roughly detected. Next, when the stylus 12 contacts the panel 10, a touching position of the contact point made by the stylus 12 can be accurately detected because the scanning procedure may focus one limited region.

In the process of sensing the touching position, the apparatus generates a scan frequency through a timing circuit. The sensing lines within the panel then perform scanning based on this scan frequency. When the touch-sensitive panel 10 senses the input signals made by the stylus 12, a touching position may be sensed by the sensing lines over the first axial direction, e.g. X axis and over the second axial direction, e.g. Y axis of the panel. Next, with the other scan frequency, the signals made by clicking the function key 122 of the stylus 12 may be detected. Through the two scan frequencies, the touching position of the stylus 12 and the signals made by the function key 122 can be determined.

According to the circumstance shown in FIG. 1, for speeding up the responsive rate of the touch-sensitive panel, the scanning process in the method may be separated into a time-division scanning stage for a specific region, and a partial scanning mode with a full-time scanning stage. For example, the peripheral portion of the panel may be firstly scanned. The peripheral portion is over both the X and Y directions, and the scanning process may be performed over one direction of them. When any touch point is scanned within a period of scanning time, the method enters a partial scanning mode. In the scanning process, if there is no any touch point detected on the peripheral portion, the method is to scan odd or even sensing lines until the touch point is found. When the touch point is detected, the scanning process is turned to a partial zone; or the scanning is performed over the peripheral portion over another direction (X or Y), or over the odd or even sensing lines.

Figure 2:
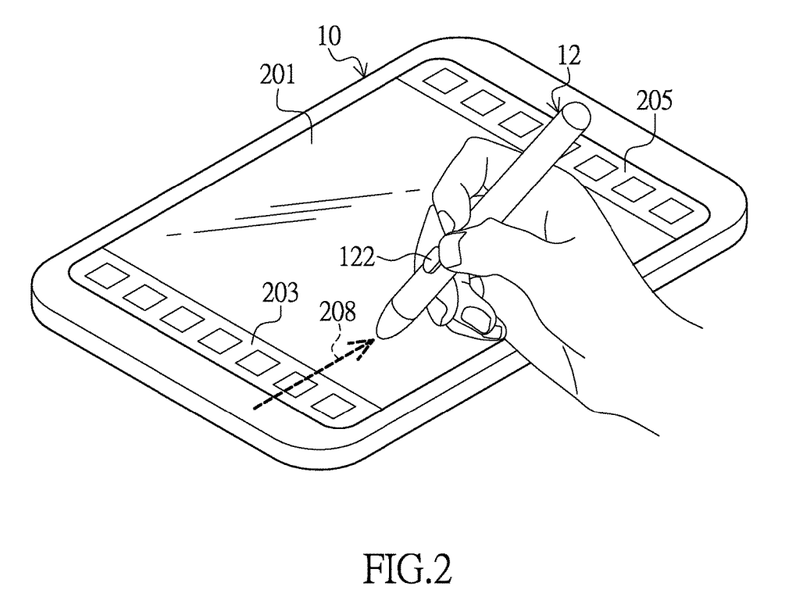
FIG. 2 schematically shows the stylus used to conduct input in another circumstance.

Reference is made to FIG. 2 illustrating a circumstance that the user uses a stylus to touch the panel.

A touch-sensitive panel 10 is shown. The touch-sensitive panel 10 is schematically divided into two types of panel zones (201, 203, and 205). For example, the panel zones may be divided into a work zone 201 and two function instruction zones 203, 205 that are designed over the two sides of the panel or a specific zone. The user handholds a stylus 12 equipped with a function key 122 to move above the touch-sensitive panel 10. According to normal behavior made by the user over the touch-sensitive panel 10, the method in the disclosure performs scanning according to scan timing with an operating frequency. Therefore, a time-division scanning scenario is made according to the user's behavior.

The moving direction 208 shown as the dotted line in the figure indicates the direction the stylus usually moves over the touch-sensitive apparatus. The direction appears the direction from peripheral portion to the centered work zone 201 of the touch-sensitive panel 10. In the exemplary embodiment, the moving direction 208 indicates that the user holds the stylus 12 to move from the peripheral function instruction zone 203 to the work zone 201. That means the function instruction zone 203 or 205 is the first zone for the user to choose one of the function instructions such as pen types of stylus, types of lines, line weights and colors. These function instructions render the patterns formed by the stylus 12 on the computer display connected with this touch-sensitive apparatus. After that, the stylus 12 held by the user may move toward the work zone 201 for performing handwriting or any input by the stylus 12.

It is noted that the method may much more focus on scanning over the peripheral portion since the peripheral portion of the touch-sensitive panel may be touched more frequently. The work zone 201 over the centered area of the panel may still work well even though it possibly sacrifices some performance.

To the scanning technology adapted to the touch-sensitive panel, two scanning frequencies may be applied. For example, a first frequency may be applied to scanning over the sensing loops along X axial direction. A second frequency may further be applied to scanning the sensing loops along the X axial direction. Next, the first frequency may be again applied to scanning the sensing loops along Y axial direction; and the second frequency may still be applied to scanning over the Y-axial loops. It view of the response rate may be inadequate or consume much more energy when the whole panel is scanned with both two frequencies over both two directions (X-Y), a time-division scanning scheme is introduced. According to one of the embodiments of the present invention, the time-division scanning method may be applied in the beginning. That means sensing the touch event over the function instruction zone 203 or 205 may have higher priority. While a triggering zone indicative of a position with respect to the touch event according to the scanning result is determined, the next scanning task is then performed over this triggering zone.

Figure 3:
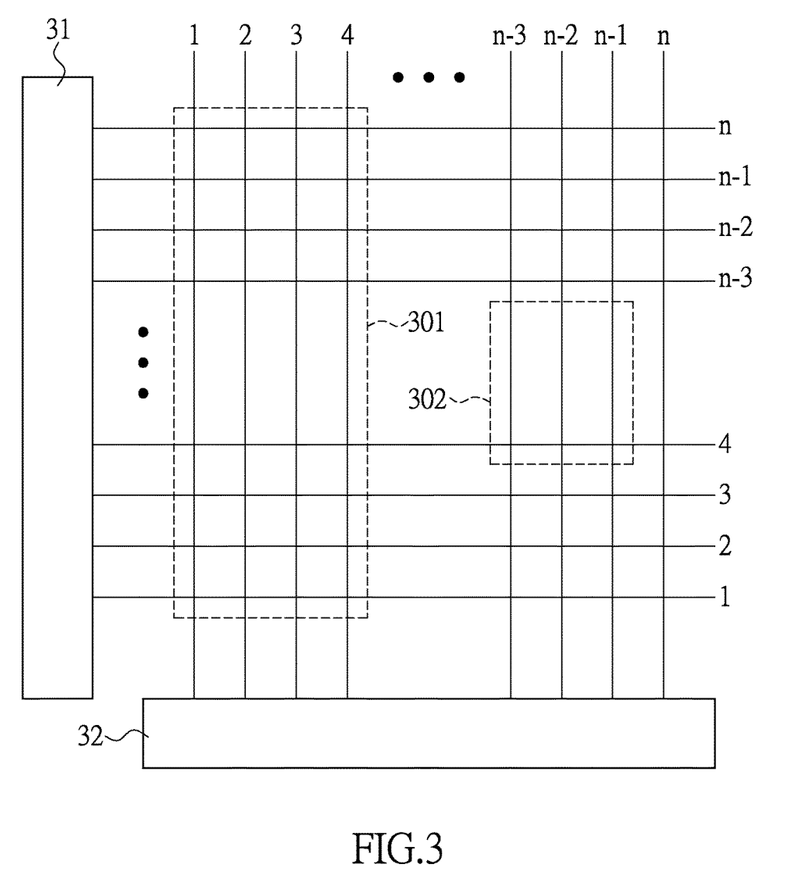
FIG. 3 shows a schematic diagram depicting the sensing circuit of the touch-sensitive apparatus in an embodiment of the present invention.

Reference is made to FIG. 3 schematically depicting the sensing circuit of the touch-sensitive apparatus according to one embodiment of the present invention.

The sensing lines 1, 2, 3, 4 . . . n−3, n−2, n−1 and n over the at least two directions schematically are shown in the figure. The crisscross sensing lines 1, 2, 3, 4 . . . n−3, n−2, n−1 and n are used to sense any touch event over the at least two directions. In the present embodiment, a first driving circuit 31 and a second driving circuit 32 associated to the sensing lines are disposed. A control circuit is further incorporated to controlling the first driving circuit 31 and the second driving circuit 32 respectively driven to electrically charge the sensing lines according to a scan timing scenario. The powered sensing lines are used to acquire the any touching signal.

In the diagram, a side area circled by the dotted square indicates a first sensing region 301, and a centered area circled by the other dotted square is a second sensing region 302. According to the property of the panel, the time-division scanning scheme is performed over the first sensing region 301 with more scanning time. The relatively less scanning time is for the second sensing region 302. While a triggering zone is determined, the further full-time scanning scheme is performed upon the triggering zone. Further, the precise position of the any touch event can be obtained.

Figure 4:
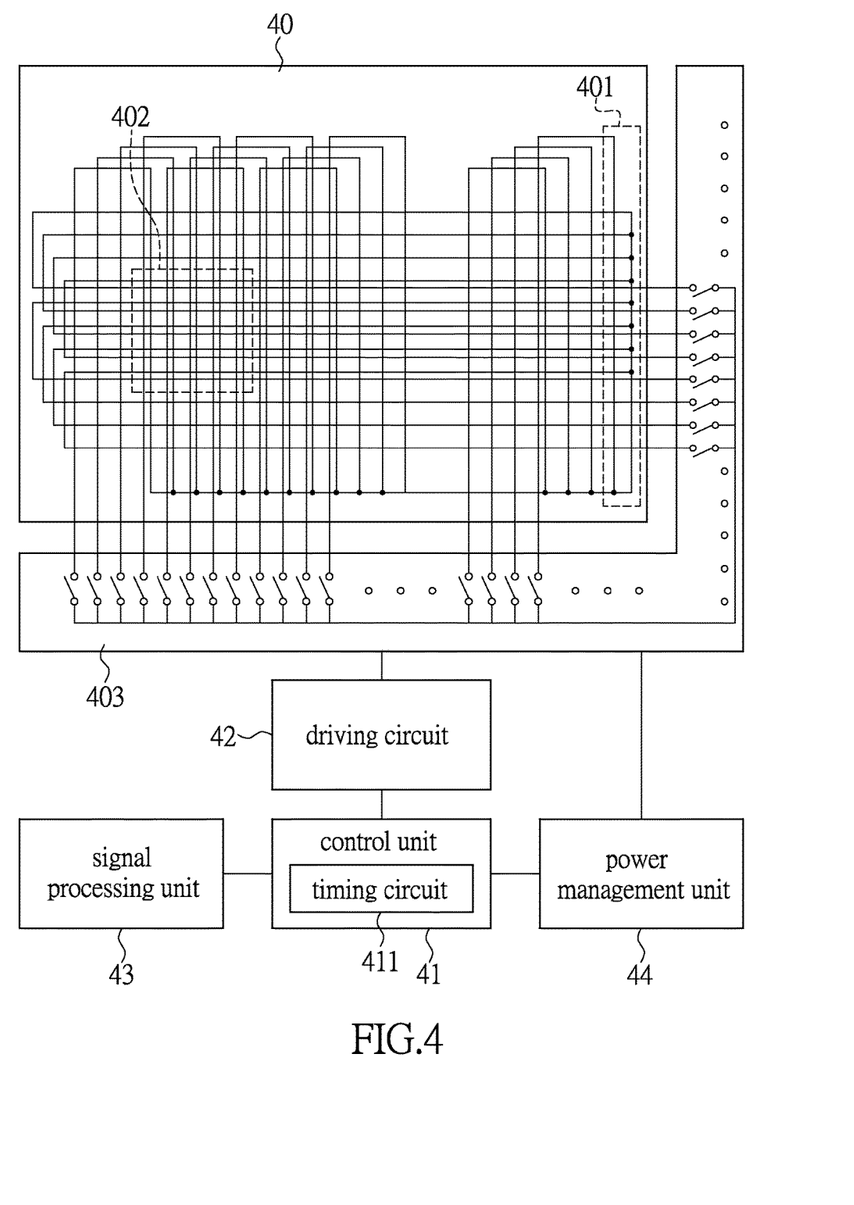
FIG. 4 shows a schematic diagram depicting the touch-sensitive apparatus in one embodiment of the present invention.

FIG. 4 shows a schematic diagram depicting the circuits of the touch-sensitive panel 40 in one embodiment of the touch-sensitive apparatus. Many loops of the sensing lines are provided over the touch-sensitive panel 40. The sensing lines over at least two directions are such as sensing lines along the first axial direction and sensing lines along the second axial direction. However, the figure shows the schematic diagram of the loops of sensing lines but not the practical implements.

The touch-sensitive apparatus has a control circuit electrically connected with the touch-sensitive panel 40. The control circuit is used to control the charging timing for the sensing lines over the first axial direction and the second axial direction. According to the scenario of charging timing, the time-division and full-time scanning are performed. In the present embodiment, based on the functions the invention performs, the control circuit may include a driving circuit 42 for a switch-selection circuit 403. According to scan frequency and time-division scanning based on the scanning scenario made by the present invention, the driving circuit 42, is driven by the control unit 41. The switch-selection circuit 403 is electrically connected with the control circuit, and also connected with the sensing lines along both the first axial direction and the second axial direction. The switch-selection circuit 403 is driven to turn on or turn off the part of all of the sensing lines according to a control signal generated by the control circuit.

The driving circuit 42 may then charge the sensing lines according to the loops on or off made by the switch-selection circuit 403. The turned-on or off loops are configured to scan the touching signals. A power management unit 44 is controlled by the control unit 41. The power management unit 44 is used to manage the electric power supplied to the sensing lines of the touch-sensitive panel 40. For example, the power management unit 44 selectively powers the sensing lines of the panel 40 through the switch-selection circuit 43 driven by the driving circuit 42.

The control unit 41 includes a timing circuit 411. The timing circuit 411 generates one or more timing signals. The timing circuit 411 is configured to render one or more scan frequencies according to the various triggering events. The control unit 41 conducts the scanning according to the timing signal so as to control the scanning timing. A scanning result may be generated in association with the various positions and frequencies while a signal processing unit 43 electrically connected with the control unit 41 processes the signals. In which, the signal processing unit 43 processes the sensing signals generated from the sensing lines over the first axial direction and the second axial direction so as to determine the triggering zone or a position related to the touch event. Further, the control unit 41 drives the full-time scanning process over the triggering zone. The output made by the signal processing unit 43 includes a touch point made by the touch object, and further confirming an operating frequency with respect to the touch event so as to determine the a triggering event. The triggering event is such as functionality triggered by the touch event. The present invention uses the scan frequency to conduct the touch scanning.

The method for scanning the touch event in accordance with the present invention, the control circuit of the panel is essentially used to conduct the scanning strategy, including performing partial scanning with one or more frequencies.

With various frequencies, the time-division scanning scheme provides a solution for power saving and maintaining a great performance. In addition to the above-described circuits, the specification of the present invention does not give necessary details of other necessary circuits such as amplifier, filter, signal converter, and any driving circuit.

Figure 5:
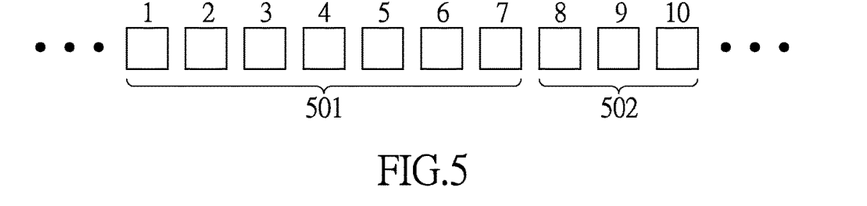
FIG. 5 schematically describes a scanning scenario within a scan period in one embodiment of the present invention.

FIG. 5 shows a schematic diagram depicting the scanning scenario within a scan period according to one embodiment of the present invention.

The shown scan timing indicates a ratio of allocating the first sensing region and the second sensing region within a scan period. That means different tasks are configured within this scan period according to the scan timing scenario. For example, the first sensing region indicates a function instruction zone of the touch-sensitive apparatus; the second sensing region may be a work zone, or a region including both the function instruction zone and work zone of the touch-sensitive apparatus. The mentioned first sensing region, second sensing region, or any triggering zone may be formed within a zone surround by part or all of the sensing lines along the different axial directions, such as the part or all sensing lines along the first axial direction and second axial direction. Therefore, according to the scanning strategy, the time-division or full-time scanning may be performed by sequentially charging part or all the sensing lines along the first axial direction and the second axial direction.

In one embodiment of the present invention, the control circuit is configured to provide a scan timing configuration. The configuration includes a ratio of allocating the scanning zones. For example, the ratio of the allocation includes a partial scanning zone with 80% of the region and remaining zone with 20% of the region.

As shown in the diagram, in first time 501, the scanning method is performed over a specific panel zone based on the configuration. The first time 501 obviously occupies a longer time of the scan timing; and the second time 502 is shorter time. The scan timing can be dynamically configured for the various scanning tasks according to the practical requirement and design.

In an exemplary embodiment of the present invention, the touch-sensitive panel performs a partial scanning over the function instruction zone within the first time 501; a full-panel scanning may be performed within the second time 502; or the scanning task is over the remaining zone such as the zone excluding the function instruction zone. In which, a partial scanning is performed within the first time 501. Another partial scanning may also be performed within the second time 502, but not for charging or scanning over the whole panel. The time-division scanning scheme introduced into the present invention achieves the power saving.

It is worth noting that, in one embodiment for the purpose of power saving, the scanning process may be orderly performed for the odd sensing lines and the even sensing lines separately according to the timing configuration.

Figure 6A:
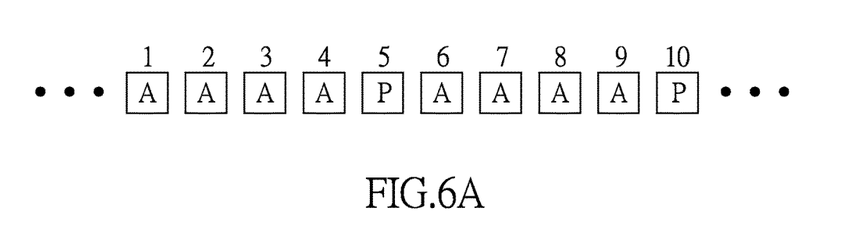
FIG. 6A schematically describes another scanning scenario within the scan period in one embodiment of the present invention.

In one further scan timing scenario, reference is made to FIG. 6A schematically depicting the scanning scenario within a scan period.

Within the scan period, scan timing may be configured to adapt to a peripheral zone A and panel zone P, e.g. the central portion, of the touch-sensitive panel. In the present example, the scan period is divided into 10 timing periods. The control circuit performs electric charging to the sensing loops over a peripheral zone A in the timing periods 1-4 and 6-9. The charging to the sensing loops over the panel zone P is performed in the timing periods 5 and 10. The panel zone P may include the zone excluding the peripheral zone A, but may also be the zone over the whole panel.

Figure 6B:
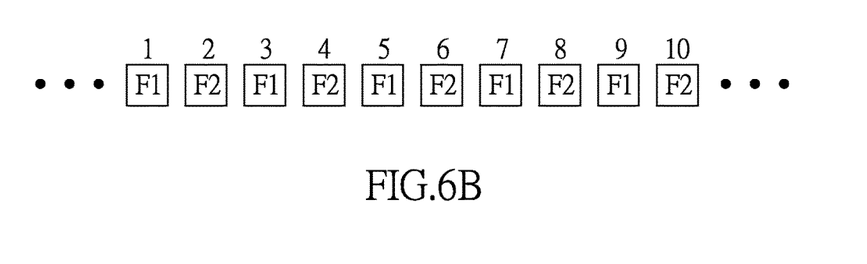
FIG. 6B schematically describes one further scanning scenario in one embodiment of the present invention.

FIG. 6B schematically shows the operating frequencies within a scan period according to a scanning strategy.

If a touch-sensitive panel is configured to be operated with two scan frequencies, scan timing with different frequencies within a scan period may be provided. For example, the method performs scanning with a first frequency F1 and a second frequency F2 within the scan period orderly. The first timing shows a touch signal is scanned with a first frequency, and the second timing shows another touch signal with a second frequency. In practice, the scan timing configured for the first frequency F1 and the second frequency F2 may occupy different proportions.

Figure 7:
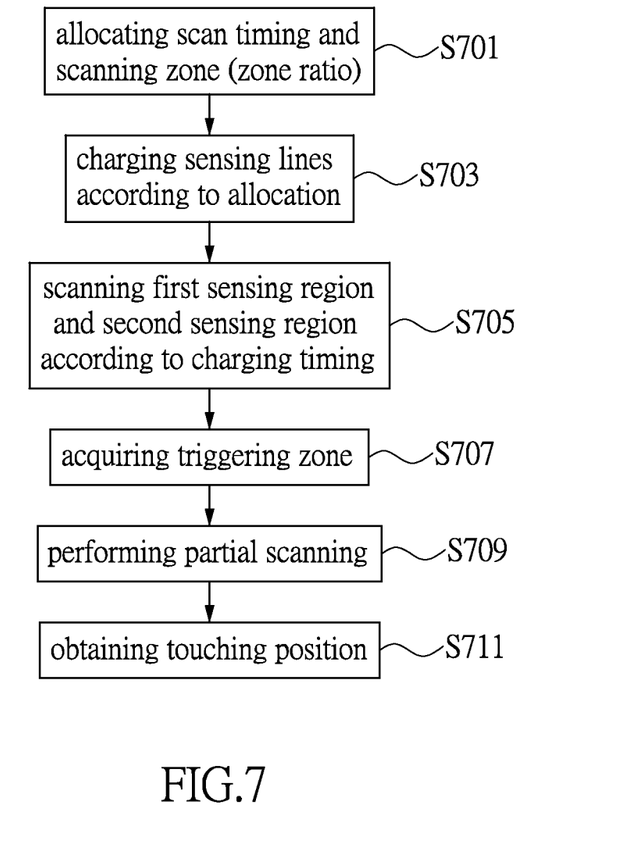
FIG. 7 shows a flow chart describing method for scanning the touch event in one embodiment of the present invention.

The flow describing the method for scanning the touch event is shown in FIG. 7.

In the beginning stage of the flow, scan timing and scan zones may be configured based on the property of the touch-sensitive apparatus or the user's behavior. That means the scanning ratio for allocating the different sensing regions are firstly provided, such as step S701 in the flow.

Next, in step S703, the part or all sensing lines are charged according to allocation of the scanning ratio according to the scan timing. The partial scanning may be operated based on the charged sensing regions within a scan period. For example, by the control circuit, the step of scanning the first sensing region and the second sensing region is performed by charging sensing lines within the first sensing region and the second sensing region according to the scan timing scenario. It is noted that the first sensing region is such as the function instruction zone, and the second sensing region is such as the work zone.

In step S705, the method is to scan the first sensing region and second sensing region according to charging timing, especially made by a time-division scanning scheme. After that, such as in step S707, a triggering zone may be determined according to a scanning result. However, this triggering zone acquired in this step may be a rough position. Next, a full-time scanning process is performed over this partial triggering zone (step S709). The partial scanning may not be limited for any specific sensing region. The full-time scanning process may sequentially scan the odd and even sensing lines. Therefore, a precise position with respect to a touch event can be obtained (step S711).

Figure 8:
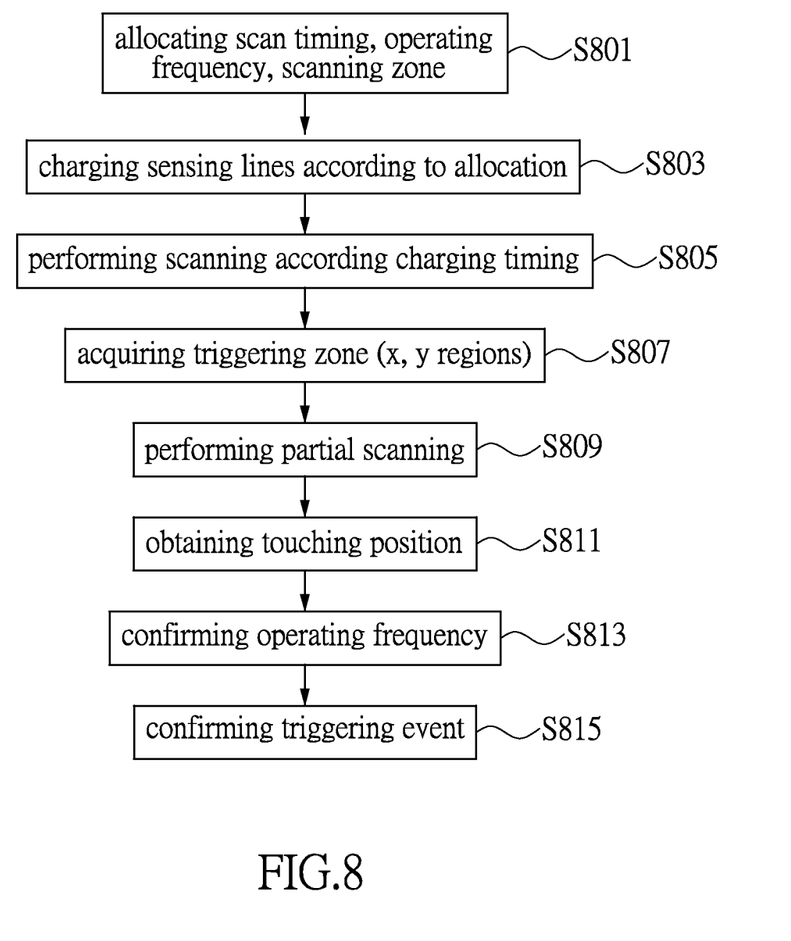
FIG. 8 shows a flow chart describing method for scanning touch event in another embodiment of the present invention.

In addition to the above-described steps of scanning the touch event, reference is next made to FIG. 8, which illustrates one further process for scanning the touch event. In particular, the panel in accordance with the present invention may operate with two different operating frequencies.

The method, such as step S801, firstly allocates scan timing, operating frequency and scanning zone within a scan period over the touch-sensitive panel. Next, in step S803, the sensing lines are electrically charged according to the above allocation for the scan timing scenario. The sensing lines may be disposed into different zones. A time-division scanning process may be performed over the zone surround by the different axial directions. The zones may be divided into the first sensing region and the second sensing region.

Next, in step S805, the control circuit performs scanning according to the charging timing. A triggering zone is obtained according to the scanning result, such as step S807, including the zone acquired along the different axial directions. For example, the triggering zone is defined by all or part of the sensing lines along the first axial direction, e.g. X axis, and the second axial direction, e.g. Y axis. Next, a full-time scanning process is performed over this triggering zone, such as step S809.

In step S811, a position with respect to the touch event can be obtained according to the scanning result. In step S813, an operating frequency associated to the touch event can be confirmed. Such as the embodiment described in FIG. 9, a gain is employed for confirming the operating frequency with respect to a specific triggering event. The triggering event may be next confirmed, such as step S815.

For example, the usually manipulation for the stylus held by the user, the peripheral instruction portion may be firstly touched. The scan timing scenario is configured to allocate higher ratio to perform the scanning over this peripheral portion. When the stylus moves above the panel with a moving position, such as with the first frequency, the position may be roughly determined, and the precision may be ignored until the final touch point is found, for example the handwriting with the second frequency is performed. The final touch point may be obtained through the full-panel scanning. The scenario may keep the performance. In one further embodiment, the triggering event may be made by the touch object such as stylus. The triggering event is the moving position of the touch object while the trigger event is confirmed with the first frequency; and the triggering event is the triggering instruction made by the touch object while the triggering event is confirmed with the second frequency. It is noted that the triggering instruction may be triggered by the function key installed in the touch object.

Figure 9:
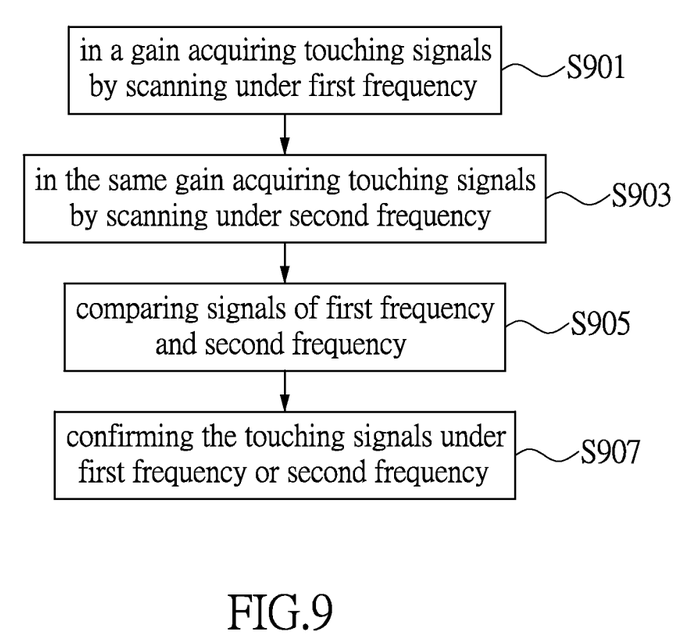
FIG. 9 exemplarily describes the steps in the method for confirming the operating frequency and the triggering event.

FIG. 9 shows the embodiment describing the steps of confirming the operating frequency and the triggering event with respect to the touch event.

The scan timing drives the scanning process performed with the first frequency and the second frequency by an auto gain control (AGC) mechanism. A gain is generated by this AGC mechanism.

While triggering signals are scanned with one of the frequencies, for example the first frequency, in a specific gain (step S901), a triggering event with respect to the touching signals are also confirmed in the same gain (step S903). Next, using the same gain, the next touching signals are acquired by scanning with the second frequency.

Next, in step S905, by comparing the touching signals of first frequency and second frequency, it confirms the triggering event being occurred with the first frequency or the second frequency (step S907).

Refer to the flow described in FIG. 8, the triggering event exemplarily indicates the moving position of the touch object if the triggering event occurs with a specific frequency, for example the first frequency. On the contrary, the triggering event is determined as a triggering instruction made by the touch object when the triggering event with the second frequency is confirmed.

To sum up the above description, the present invention is related to a touch-sensitive apparatus, a control circuit, and a method for scanning the touch event. It is featured that a time-division scanning process is performed over a portion of the event; and the full-time scanning is performed if any signal is checked. The invention allows the panel scanning to accomplish fast response time, power saving and great performance.

It is intended that the specification and depicted embodiment be considered exemplary only, with a true scope of the invention being determined by the broad meaning of the following claims.

What is claimed is:

1. A method of scanning for a touch event to obtain a touching position on a touch-sensitive apparatus, comprising:
    charging sensing lines in a first sensing region and a second sensing region;
    scanning the first sensing region with a first frequency F1 and scanning the second sensing region with a second frequency F2 different from the first frequency F1 in accordance with a scan timing scenario including a time-division scheme which divides a scan period into sub-periods, wherein the scan timing scenario includes allocation of a ratio of scanning the first sensing region and the second sensing region within the scan period;
    acquiring a triggering zone according to a scanning result of the scanning of the first sensing region and the second sensing region, wherein the triggering zone is either one of the first sensing region and the second sensing region; and
    performing a full-time scanning of the triggering zone for the scan period and determining a position with respect to a touch event.

2. The method of claim 1, wherein the first sensing region is a function instruction zone of the touch-sensitive apparatus; and the second sensing region is a work zone of the touch-sensitive apparatus or a zone including both the function instruction zone and the work zone.

3. The method of claim 2, wherein the triggering zone is formed by all or part of the sensing lines that extend along a first axial direction and a second axial direction; and the time-division scanning or the full-time scanning is performed by sequentially charging the all or part of the sensing lines.

4. A method of scanning for a touch event to obtain a touching position and a triggering event by sensing a touch object touching a touch-sensitive apparatus, comprising:
    charging sensing lines in a first sensing region and a second sensing region;
    scanning the first sensing region with a first frequency F1 and scanning the second sensing region with a second frequency F2 different from the first frequency F1 in accordance with a scan timing scenario including a time-division scheme which divides a scan period into sub-periods, wherein the scan timing scenario includes allocation of a ratio of scanning the first sensing region and the second sensing region within the scan period;
    acquiring a triggering zone according to a scanning result of the scanning of the first sensing region and the second sensing region, wherein the triggering zone is either one of the first sensing region and the second sensing region;
    performing a full-time scanning of the triggering zone for the scan period;
    determining the touching position where the touch object touches the touch-sensitive apparatus;
    determining an operating frequency of the touch event including the touching position, the operating frequency corresponding to the triggering event; and
    determining the triggering event according to the operating frequency.

5. The method of claim 4, wherein the first sensing region is a function instruction zone of the touch-sensitive apparatus; and the second sensing region is a work zone of the touch-sensitive apparatus or a zone including both the function instruction zone and the work zone.

6. The method of claim 5, wherein the triggering zone is formed by all or part of the sensing lines that extend along a first axial direction and a second axial direction; and the time-division scanning or the full-time scanning is performed by sequentially charging the all or part of the sensing lines.

7. The method of claim 4, wherein the operating frequency includes the first frequency F1 and the second frequency F2; and the touch-sensitive apparatus is operated with the first frequency F1 and the second frequency F2 simultaneously.

8. The method of claim 7, wherein the step of determining the triggering event according to the operating frequency includes:
acquiring touching signals in the first frequency F1 by scanning the touch-sensitive apparatus with a gain;
acquiring touching signals in the second frequency F2 by scanning the apparatus with the same gain;
comparing the touching signals in the first frequency F1 and the touching signals in the second frequency F2; and
determining whether the triggering event is caused by the touch object in the first frequency F1 or in the second frequency F2 according to the comparison.

9. The method of claim 8, wherein the triggering event indicates a moving position or a triggering instruction with respect to the touch object; wherein the triggering event is the moving position of the touch object when the trigger event is determined to be in the first frequency F1; and the triggering event is the triggering instruction made by the touch object when the triggering event is determined to be in the second frequency F2.

10. The method of claim 9, wherein the gamin is generated by an automatic gain control mechanism for scan signals of the touch-sensitive apparatus.

11. A touch-sensitive apparatus, comprising:
a touch-sensitive panel, including sensing lines that extend along a first axial direction and a second axial direction;
a control circuit, electrically connected with the touch-sensitive panel, used to control charging timing of the sensing lines along the first axial direction and the second axial direction, to perform time-division scanning and full-time scanning, the time-division scanning including dividing a scan period into sub-periods, allocating a ratio of scanning a first sensing region and a second sensing region within the scan period, charging the sensing lines in the first sensing region and the second sensing region, scanning the first sensing region with a first frequency F1 and scanning the second sensing region with a second frequency F2 different from the first frequency F1, and acquiring a triggering zone which is either one of the first sensing region and the second sensing region, and the full-time scanning including performing a full-time scanning of the triggering zone for the scan period; and
a switch-selection circuit, electrically connected with the control circuit, used to turn on or turn off part or all of the sensing lines according to a control signal from the control circuit.

12. The apparatus of claim 11, wherein the control circuit includes a driving circuit used to drive the sensing lines.

13. The apparatus of claim 12, wherein the control circuit includes a power management circuit used to manage power supplied to the sensing lines of the touch-sensitive panel, and the driving circuit is used to selectively supply power to the sensing lines through the switch-selection circuit.

14. The apparatus of claim 13, wherein the control circuit includes a signal processing circuit used to determine the triggering zone or a position of a touch event according to sensing signals generated respectively by the sensing lines extending along the first axial direction and the sensing lines extending along the second axial direction.

15. The apparatus of claim 14, wherein, when the signal processing circuit determines the position of a touch event, the signal processing circuit determines an operating frequency of the touch event to determine the triggering event.

* * * * *

UNITED STATES PATENT AND TRADEMARK OFFICE
CERTIFICATE OF CORRECTION

| | | |
|---|---|---|
| PATENT NO. | : 9,798,435 B2 | Page 1 of 1 |
| APPLICATION NO. | : 14/058224 | |
| DATED | : October 24, 2017 | |
| INVENTOR(S) | : Chang-Hsien Chen et al. | |

It is certified that error appears in the above-identified patent and that said Letters Patent is hereby corrected as shown below:

In the Claims

Column 11, Line 27:
"10. The method of claim 9, wherein the gamin is generated" should read, --10. The method of claim 9, wherein the gain is generated--.

Signed and Sealed this
Twentieth Day of February, 2018

Andrei Iancu
*Director of the United States Patent and Trademark Office*